US008903033B2

(12) United States Patent
Morton et al.

(10) Patent No.: US 8,903,033 B2
(45) Date of Patent: Dec. 2, 2014

(54) HIGH RESOLUTION DIGITAL ROD POSITION INDICATION SYSTEM FOR NUCLEAR POWER PLANTS

(75) Inventors: Gregory M. Morton, Knoxville, TN (US); Hashem M. Hashemian, Knoxville, TN (US); Brent D. Shumaker, Knoxville, TN (US); Danny D. Beverly, Knoxville, TN (US); Casey D. Sexton, Knoxville, TN (US)

(73) Assignee: Analysis and Measurement Service Corporation, Knoxville, TN (US)

( * ) Notice: Subject to any disclaimer, the term of this patent is extended or adjusted under 35 U.S.C. 154(b) by 1135 days.

(21) Appl. No.: 12/351,745

(22) Filed: Jan. 9, 2009

(65) Prior Publication Data

US 2014/0321593 A1    Oct. 30, 2014

Related U.S. Application Data

(60) Provisional application No. 61/020,054, filed on Jan. 9, 2008.

(51) Int. Cl.
*G21C 17/00* (2006.01)
(52) U.S. Cl.
USPC .......................................................... 376/245
(58) Field of Classification Search
CPC .......................... G21Y 2002/204; G21C 17/00

USPC .......................................................... 376/245
See application file for complete search history.

(56) References Cited

U.S. PATENT DOCUMENTS

| | | | | |
|---|---|---|---|---|
| 3,846,771 A | * | 11/1974 | Young et al. | 340/870.31 |
| 4,371,496 A | * | 2/1983 | Lawson et al. | 376/258 |
| 4,646,012 A | * | 2/1987 | Feilchenfeld et al. | 324/207.12 |
| 4,741,878 A | * | 5/1988 | Gebelin et al. | 376/248 |
| 4,927,594 A | * | 5/1990 | Heibel et al. | 376/258 |
| 5,142,226 A | * | 8/1992 | Sakamoto et al. | 324/207.24 |
| 5,754,611 A | * | 5/1998 | Petit | 376/258 |
| 7,982,459 B2 | * | 7/2011 | Killian et al. | 324/240 |
| 8,351,561 B2 | * | 1/2013 | Hashemian et al. | 376/258 |
| 8,442,180 B2 | * | 5/2013 | Nakamura et al. | 376/258 |

* cited by examiner

*Primary Examiner* — Frank J McGue
(74) *Attorney, Agent, or Firm* — Pitts & Lake, P.C.

(57) ABSTRACT

A high resolution digital rod position indication (high resolution DRPI) system having improved resolution. The high resolution DRPI system monitors the rod control cluster and provides an indication of the rod position with precision to a single step. In addition, the high resolution DRPI system is capable of producing a rod position output compatible with existing rod control systems. The improved resolution of the high resolution DRPI system allows the actual position of the control rods to be continuously monitored and eliminates the need for or reduces the frequency of offline re-initialization of the step counters.

14 Claims, 9 Drawing Sheets

HIGH RESOLUTION DIGITAL ROD POSITION INDICATION SYSTEM FOR NUCLEAR POWER PLANTS

CROSS-REFERENCE TO RELATED APPLICATIONS

This application claims the benefit of U.S. Provisional Application No. 61/020,054, filed Jan. 9, 2008.

STATEMENT REGARDING FEDERALLY-SPONSORED RESEARCH OR DEVELOPMENT

Not Applicable

BACKGROUND OF THE INVENTION

1. Field of Invention

This invention relates to a digital rod position indication system for use in a nuclear power plant. More specifically, this invention relates to a high resolution digital rod position indication system having improved resolution compared to conventional rod position indication systems.

2. Description of the Related Art

In a Pressurized Water Reactor (PWR), the power level of the reactor 10 is controlled by inserting and retracting the control rods 12, which for purposes of this application include the shutdown rods, into the reactor core 14. The control rods are moved by the Control Rod Drive Mechanisms (CRDM), which are electromechanical jacks that raise or lower the control rods in increments. The CRDM includes a lift coil $DM_L$, a moveable gripper coil $DM_M$, and a stationary gripper coil $DM_S$ that are controlled by the Rod Control System (RCS) and a ferromagnetic drive rod that is coupled to the control rod and moves within the pressure housing 16. The drive rod includes a number of circumferential grooves at ⅝ inch intervals ("steps") that define the range of movement for the control rod. A typical drive rod contains approximately 231 grooves, although this number may vary. The moveable gripper coil mechanically engages the grooves of the drive rod when energized and disengages from the drive rod when de-energized. Energizing the lift coil raises the moveable gripper coil (and the control rod if the moveable gripper coil is energized) by one step. Energizing the moveable gripper coil and de-energizing the lift coil moves the control rod down one step. Similarly, when energized, the stationary gripper coil engages the drive rod to maintain the position of the control rod and, when de-energized, disengages from the drive rod to allow the control rod to move. The RCS includes the logic cabinet and the power cabinet. The logic cabinet receives manual demand signals from an operator or automatic demand signals from Reactor Control and provides the command signals needed to operate the shutdown and control rods according to a predetermined schedule. The power cabinet provides the programmed dc current to the operating coils of the CRDM.

Current PWR designs have no direct indication of the actual position of each control rod. Instead, step counters associated with the control rods are maintained by the RCS and rod position indication (RPI) systems to monitor the positions of the control rods within the reactor. The associated step counter is incremented or decremented when movement of a control rod is demanded and successful movement is verified. Because the step counter only reports the expected position of the control rod, certain conditions can result in the step counter failing and deviating from the actual position of the control rod. In certain situations where the actual position of the control rod is known, the step counter can be manually adjusted to reflect the actual position. However, if the actual position of the control rod is not known, a plant shutdown may be required so that the step counters to be initialized to zero while the control rods are at core bottom.

The RPI systems derive the axial positions of the control rods by direct measurement of drive rod positions. Currently both analog rod position indication (ARPI) systems and digital rod position indication (DRPI) systems are in use in PWRs. The conventional DRPI systems have been in service for over 30 years in nuclear power stations worldwide and are currently being used as the basis for the rod position indication systems in the new Westinghouse AP1000 designs.

A conventional DRPI system includes two coil stacks for each control rod and the associated DPRI electronics for processing the signals from the coil stacks. Each coil stack is an independent channels of coils placed over the pressure housing. Each channel includes 21 coils. The coils are interleaved and positioned at 3.75 inch intervals (6 steps). The DRPI electronics for each coil stack of each control rod are located in a pair of redundant data cabinets (Data Cabinets A and B). Although intended to provide independent verification of the control rod position, conventional DRPI systems are not accurate to fewer than 6 steps. The overall accuracy of a DRPI system is considered to be accurate within ±3.75 inches (6 steps) with both channels functioning and ±7.5 inches using a single channel (12 steps). In contrast to the conventional DRPI system, a conventional ARPI system determines the position based on the amplitude of the dc output voltage of an electrical coil stack linear variable differential transformer. The overall accuracy of a properly calibrated ARPI system is considered to be accurate within ±7.2 inches (12 steps). Neither conventional ARPI systems nor conventional DRPI systems are capable of determining the actual positions of the control rods.

It should be noted that for purposes of this application, the phrase "control rod" is used generically to refer to a unit for which separate axial position information is maintained, such as a group of control rods physically connected in a cluster assembly. The number of control rods varies according to the plant design. For example, a typical four-loop PWR has 53 control rods. Each control rod requires its own sets of coils having one or more channels and the DRPI electronics associated with each channel. Thus, in a typical four-loop PWR, the entire DPRI system would include 53 coil stacks, each having two independent channels, and 106 DPRI electronics units. Further, in this application, the phrase "coil stack" is used generically to refer to the detector coils associated with each control rod and should be understood to include either or both channels of detector coils. Thus, a measurement across a coil stack contemplates the value across both channels combined and/or the value across a single channel.

The failure of either or both of the RPI system and the step counter can result in a plant shutdown to resolve the problem. For example, if both the step counter and the conventional RPI system fail, no position information is available and a plant shutdown is required to re-initialize the step counter and synchronize the two systems. Similarly, if either the step counter or the conventional RPI system develops a problem causing the position information reported by the two systems to differ by more than the allowable difference, a plant shutdown for re-initialization of the step counter and synchronization of the two systems is required. The allowable difference is typically 12 steps based on the resolution of a DRPI system operating from a single coil stack.

Unfortunately, aging and obsolescence issues have led to an increase in problems with conventional DRPI systems including analog card failures and coil cable connection problems that, in some cases, may result in unplanned reactor trips. These problems, along with plans for plant life extension, have prompted the industry to actively seek viable options to monitor the health and accuracy of the DRPI systems and/or to replace failing systems in order to ensure reliable plant operations for decades to come.

Beyond the technical problems of the conventional DRPI systems, regulatory issues exist. Many existing PWRs are approaching the end of qualified life for several components of the conventional DRPI systems during the next decade and are actively seeking replacement options at this time. There has been a significant push in recent years for plants to replace aging analog systems with digital systems made from commercially-available off-the-shelf parts. Using readily-available commercial parts provide plants more options for replacement in the future.

BRIEF SUMMARY OF THE INVENTION

A high resolution digital rod position indication (high resolution DRPI) system having improved resolution is described in detail herein and illustrated in the accompanying figures. The high resolution DRPI system monitors the rod control cluster and provides an indication of the rod position with precision to a single step. In addition, the high resolution DRPI system is capable of producing a rod position output compatible with existing rod control systems. The improved resolution of the high resolution DRPI system allows the actual position of the control rods to be continuously monitored and eliminates the need for or reduces the frequency of offline re-initialization of the step counters.

The high resolution DRPI system can be implemented as a complete system in a new plant design or a supplemental system that works in conjunction with portions of a conventional DRPI system to provide position measurements with improved resolution compared to the conventional DRPI. The high resolution DRPI system includes high resolution DRPI electronics that are connected to and monitor the electrical signals from the plurality of detector coils and the reference voltage. The high resolution DRPI electronics include a data acquisition unit in communication with an interface device. The high resolution DRPI data acquisition unit has a number of analog inputs equal to the number of coils in a single channel plus an additional input for the reference line. The electronic signals produced by each DRPI coil are sampled by high resolution DRPI data acquisition unit. The interface transmits the sampled data to the high resolution DRPI processing unit located outside containment.

Analysis of actual measured data from obtained from the detector coils shows that each step clearly produces a measureable change in the RMS voltage. More specifically, the RMS voltage obtained using detector coil outputs shows a series of discrete steps that occur as a result of operation of the CRDM moving the drive rod one step at a time. Likewise, the dc voltage signal obtained from the sampled data of the detector coils shows a voltage fluctuation corresponding to each step of the control rod. The high resolution DRPI system captures and processes this information allowing an accurate determination of the actual position of the drive rod with single step precision, effectively improving the resolution of the position information 6 times when compared to conventional DRPI systems.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

A high resolution digital rod position indication (high resolution DRPI) system having improved resolution compared to conventional digital rod position indication (DRPI) systems is described in detail herein and illustrated in the accompanying figures. The high resolution DRPI system monitors the rod control cluster and provides an indication of the rod position with precision to a single step. In addition, the high resolution DRPI system is capable of producing a rod position output compatible with existing rod control systems. The improved resolution of the high resolution DRPI system allows the actual position of the control rods to be continuously monitored and eliminates the need for or reduces the frequency of offline re-initialization of the step counters.

Figure 1:
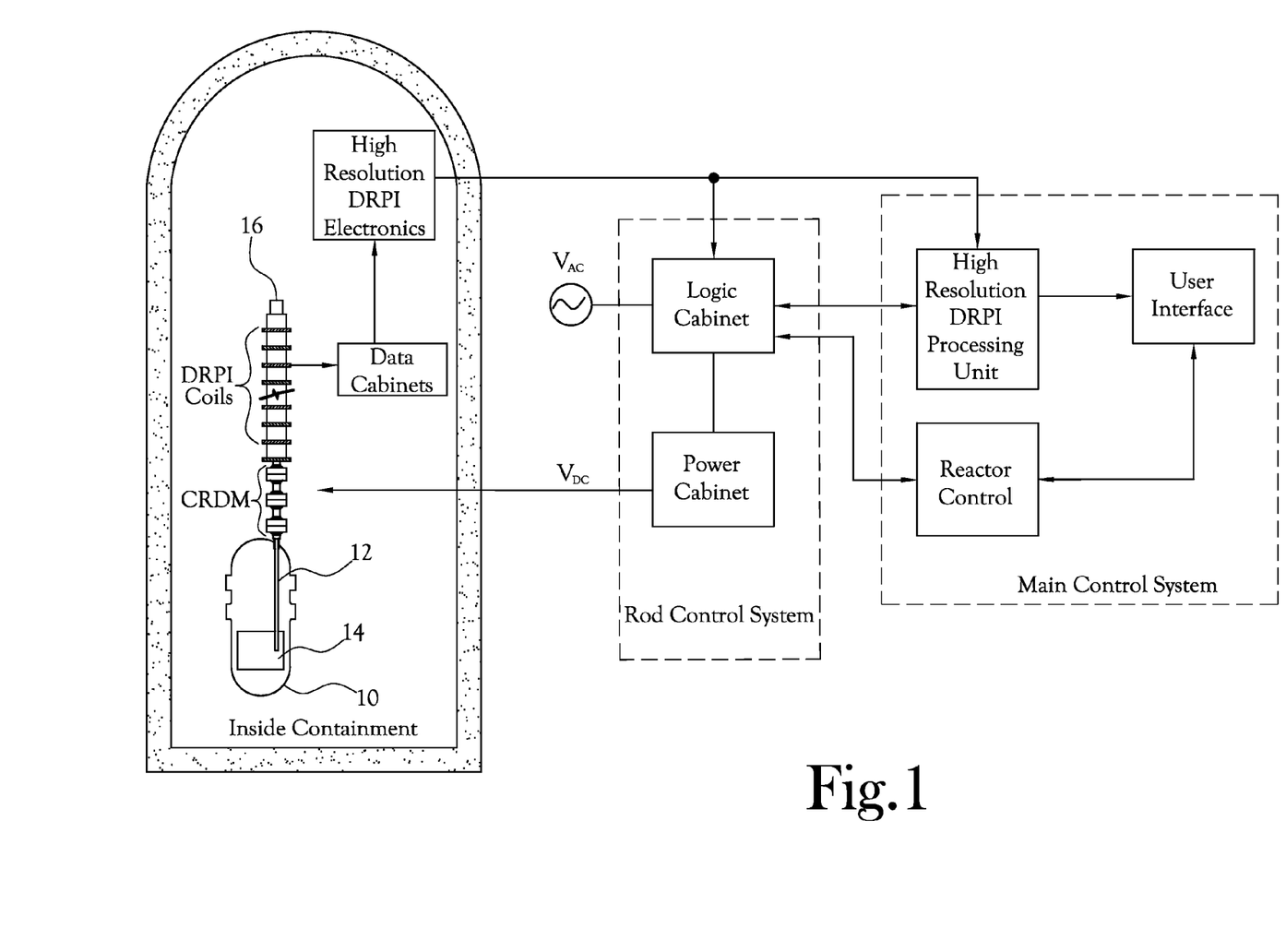
FIG. 1 is a block diagram of the high resolution digital rod position indication (high resolution DRPI) system in a pressurized water reactor (PWR)

FIG. 1 is a block diagram of a high resolution DRPI system in a pressurized water reactor (PWR). A brief overview of the systems of a PWR that are relevant to the high resolution DRPI can be found in the description of the related art. The high resolution DRPI system can be implemented as a complete system in a new plant design or a supplemental system that works in conjunction with portions of a conventional DRPI system to provide position measurements with improved resolution compared to the conventional DRPI. In the illustrated embodiment, the high resolution DRPI system includes the high resolution DRPI electronics located inside containment and the high resolution DRPI processing unit located outside containment in the main control room. The high resolution DRPI electronics sample the electrical signals from the detector coils common to DRPI systems and transmit the sampled data to the high resolution DRPI processing unit. The high resolution DRPI processing unit evaluates the sampled data from the high resolution DRPI electronics to derive the positions of the control rods. The position information generated by the high resolution DRPI processing unit is displayed to the reactor operators via a user interface and may be used to verify the position information maintained by the step counters of the rod control system (RCS).

Figure 2:
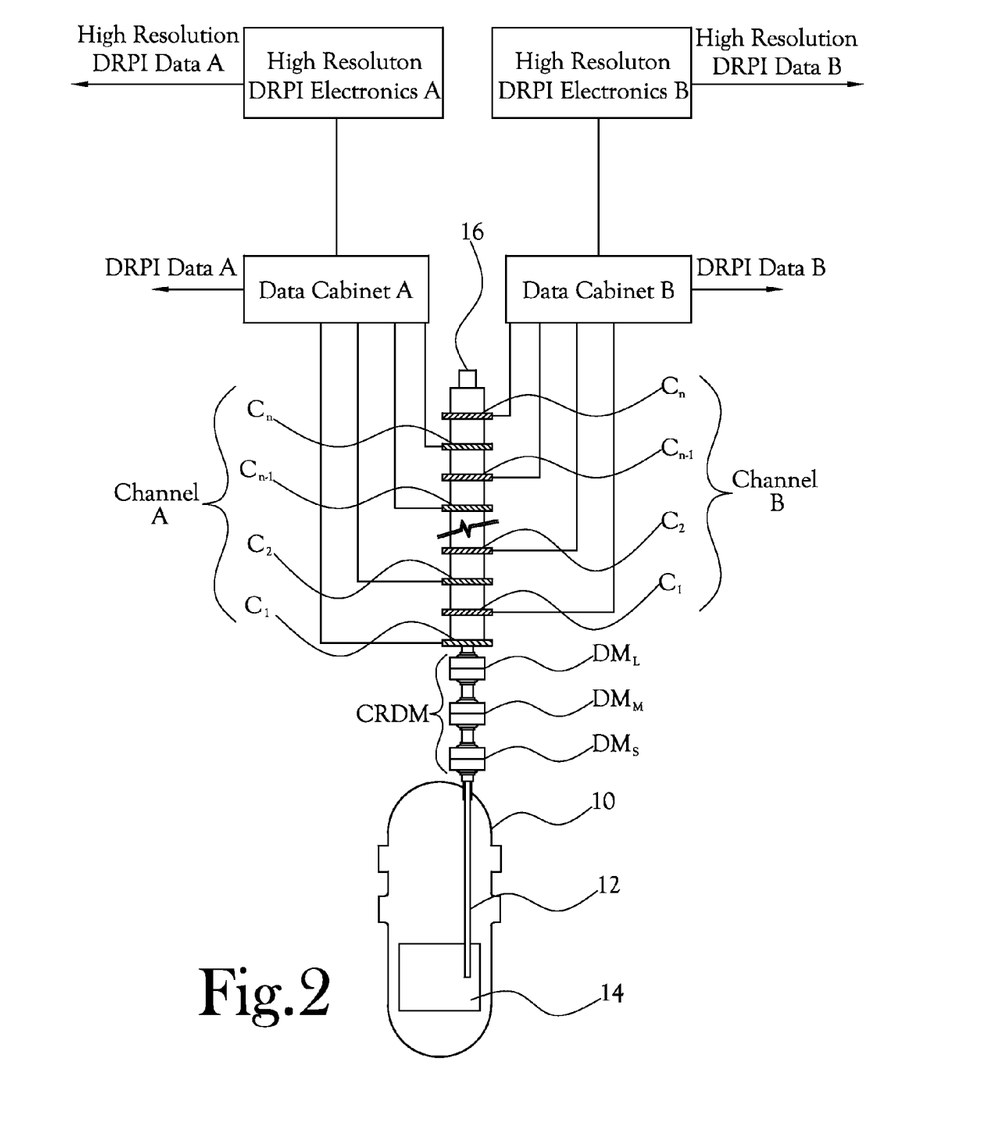
FIG. 2 is a block diagram of one embodiment of the inside containment portions of the high resolution DRPI system.

FIG. 2 illustrates one embodiment of the high resolution DRPI system used to retrofit plants with existing conventional DRPI systems. The conventional DRPI system consists of two redundant components (Data Cabinets A and B) located inside the containment area and in communication with the detector coils of the coil stacks and mounted on the rod control housings above the reactor. In this embodiment, the high resolution DRPI electronics are connected to the data cabinets at a point between the input from the existing detector coils and the conventional DRPI electronics allowing the high resolution DRPI electronics to sample the DRPI coil currents and convert them into digital signals. The digital signal is then transmitted to the high resolution DRPI processing unit in the main control room.

Figure 3:
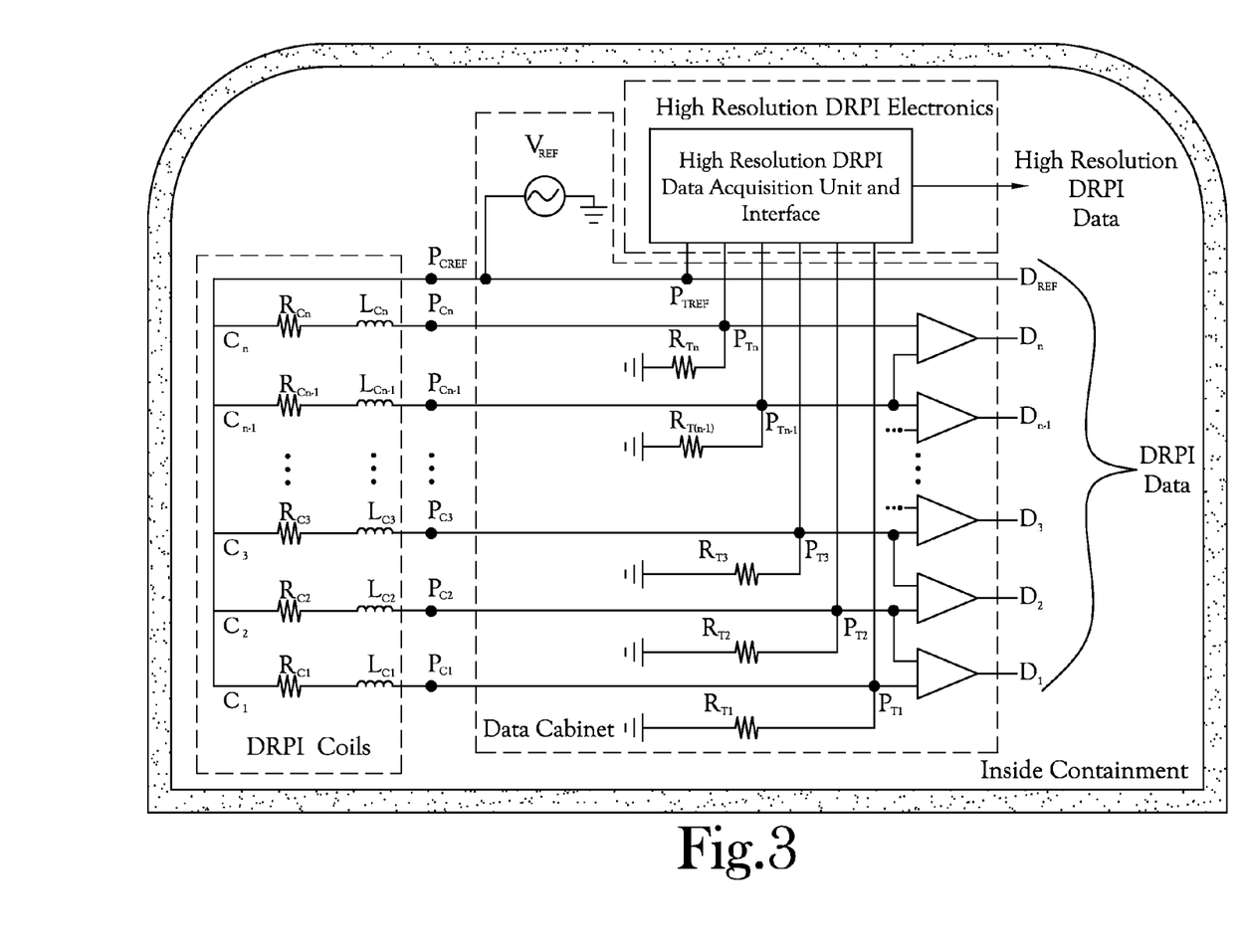
FIG. 3 shows of one embodiment of the high resolution DRPI electronics retrofitted to an existing conventional DRPI system.

FIG. 3 is a diagram of one embodiment of the high resolution DRPI electronics used in the retrofit application of FIG. 2. In this embodiment, the high resolution DRPI electronics are connected to the test points $P_{T1}$-$P_{Tn}$, $P_{TREF}$ in the data cabinets of the conventional DRPI. The test points $P_{T1}$-$P_{Tn}$, $P_{TREF}$ provide access to the electrical signals from the plurality of detector coils $C_1$-$C_n$ and the reference voltage $V_{REF}$. The high resolution DRPI electronics include a data acquisition unit in communication with an interface device. Each control rod has one high resolution DRPI electronics unit for each independent channel of the coil stack associated with the control rod. For example, a PWR having 53 control rods monitored by redundant DPRI systems (53 coil stacks with two independent channels) would have 106 ADPRI electronics (53 per data cabinet). In one embodiment, each high resolution DRPI data acquisition unit has a number of analog inputs equal to the number of coils in a single channel plus an additional input for the reference line. The electronic signals produced by each DRPI coil are sampled by high resolution DRPI data acquisition unit. The interface unit is used to transmit the sampled data to the high resolution DRPI processing unit located outside containment. The interface unit is selected to have sufficient data transmission speeds to send the sampled data to the high resolution DRPI processing unit in real time. By way of example, one suitable device for performing the functions of the high resolution DRPI data acquisition unit and the interface unit is the CompactRIO remote high speed interface system produced by National Instruments Corporation, which includes swappable I/O modules connected to an FPGA for acquiring various types of signals including the voltage and current signals used by the high resolution DRPI system and a high speed interface allowing an external computer to communicate with the FPGA at data rates up to 50 MB/s. One skilled in the art will recognize that the general specifications for the high resolution DRPI electronics are not intended to be limiting and that deviations intended to acquire sufficient data containing information from which the positions of the control rods to a single step can be derived are considered to remain with the scope and spirit of the appended claims.

Figure 4:
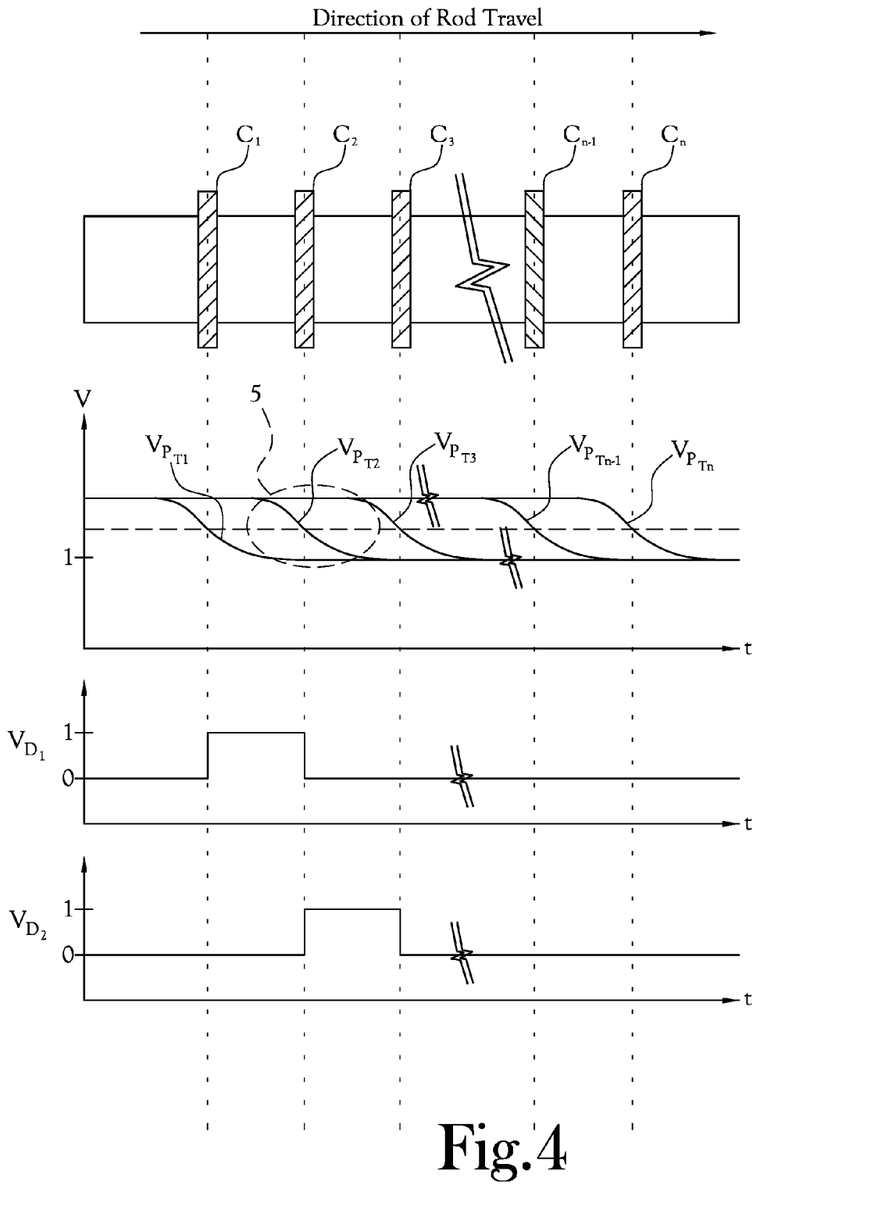
FIG. 4 illustrates idealized representations of the output from the detector coils and the corresponding outputs from the conventional DRPI electronics shown in relation to the movement a control rod.

To better appreciate the high resolution DRPI system, a brief discussion of rod movement and control and of the operation of conventional DRPI systems is appropriate. FIG. 4 relates the electrical signals produced by the detector coils to rod movement and the output of a conventional DPRI system. In a conventional DPRI system, the detector coils $C_1$-$C_n$ are excited by a low-voltage ac source $V_{REF}$ generating a magnetic field around each of the detector coils. While undisturbed, the output voltage of each DRPI coil remains steady. As the drive rod approaches a DRPI coil, the magnetic field varies and the voltage induced in the DRPI coil changes. The output voltage of a DRPI coil is greatest when the drive rod is not interrupting the magnetic field, i.e., when the drive rod does not pass through the DRPI coil. As the drive rod passes through the DRPI coil, it interrupts the magnetic field and reduces the induced voltage. Thus, the output voltage of a DRPI coil is minimized when the drive rod passes through that DRPI coil. The outputs of neighboring detector coils are fed into a bank of differential amplifiers and logic components to produce the output signals of the conventional DRPI electronics. The changes in the DPRI electronics output signals indicate the movement of the drive rod into or out of a particular coil giving the approximate positions the control rods. As discussed in the background section, the position information provided by the conventional DRPI system is only accurate, at best, to within 6 steps. In other words, the precision of a conventional DRPI system is limited by the number of detector coils and their spacing.

The output of the conventional DRPI electronics are shown in FIG. 3 by signals $V_{D1}$, representing the voltage differential between the first coil $C_1$ and the second coil $C_2$, and $V_{D2}$, representing the voltage differential between the second coil $C_2$ and the third coil $C_3$, as a control rod 12 is withdrawn from the reactor core 14. For reference, the first coil $C_1$ is the bottom coil in the coil stack and the highest numbered coil $C_n$ is the top coil in the coil stack. As the control rod is withdrawn, the drive rod moves upward through the coil stack. Initially, the drive rod does not pass through any of the detector coils and the output voltage of all of the detector coils is maximized. At this point, all of the outputs of the conventional DRPI electronics are logical zeros. As the drive rod passes through the first coil $C_1$, the output voltage of the first coil $C_1$ falls while the output voltage of the second coil $C_2$ remains high. The resulting voltage differential produces a logical one at the first conventional DRPI electronics output $D_1$. The drive rod continues to rise and passes through the second coil $C_2$ causing the output voltage of the second coil $C_2$ to fall. At this point, the output voltages of the first coil $C_1$ and the second coil $C_2$ are both low. Because the voltage differential between the first coil $C_1$ and the second coil $C_2$ is no longer large, the first conventional DRPI electronics output $D_1$ once again becomes a logical zero. However, a significant voltage differential exists between the second coil $C_2$ and the third coil $C_3$ because the voltage of the second coil $C_2$ is low while the voltage of the third coil $C_3$ remains high. This causes the second conventional DRPI electronics output $D_2$ to produce a logical one. Thus, each time the drive rod moves into or out of a DRPI coil, the resulting difference in voltage from the neighbor coil allows the most recently affected coil to be identified, thereby allowing the approximate position of the control rod to be determined with a resolution corresponding to the number of active detector coils.

The high resolution DRPI system described herein provides higher resolution position information than is available with conventional DRPI systems. A prototype of the high resolution DPRI system was tested at the Farley nuclear power plant using a single channel of detector coils for one control rod when withdrawing the control rod 226 steps out of core, inserting the control rod 226 steps into the core, and during rod drop testing. FIGS. 5-8 show portions of the data obtained during testing of the prototype.

Figure 5:
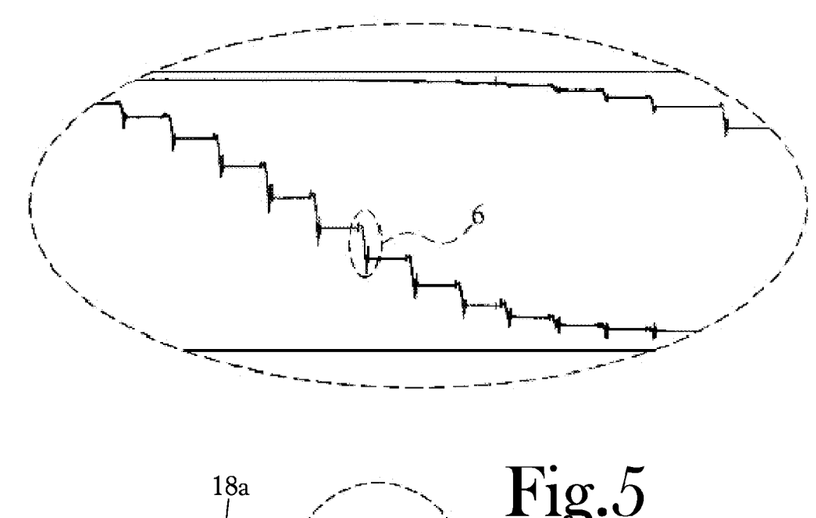
FIG. 5 illustrates the discernable features of the root-mean-square voltage ($V_{RMS}$) corresponding to the group steps of the control rod centered around a single coil using sampled data in place of one of the idealized representations of FIG. 4.
Figure 6:
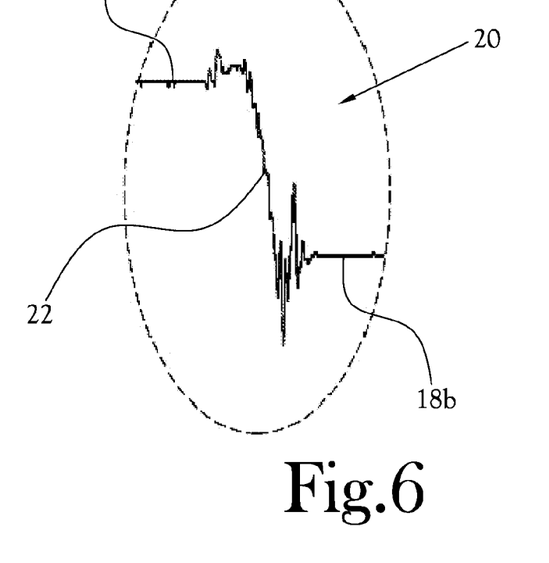
FIG. 6 illustrates a single step from the sample of FIG. 5 showing the discernable features of the signal corresponding to one step of the control rod in greater detail.
Figure 7:
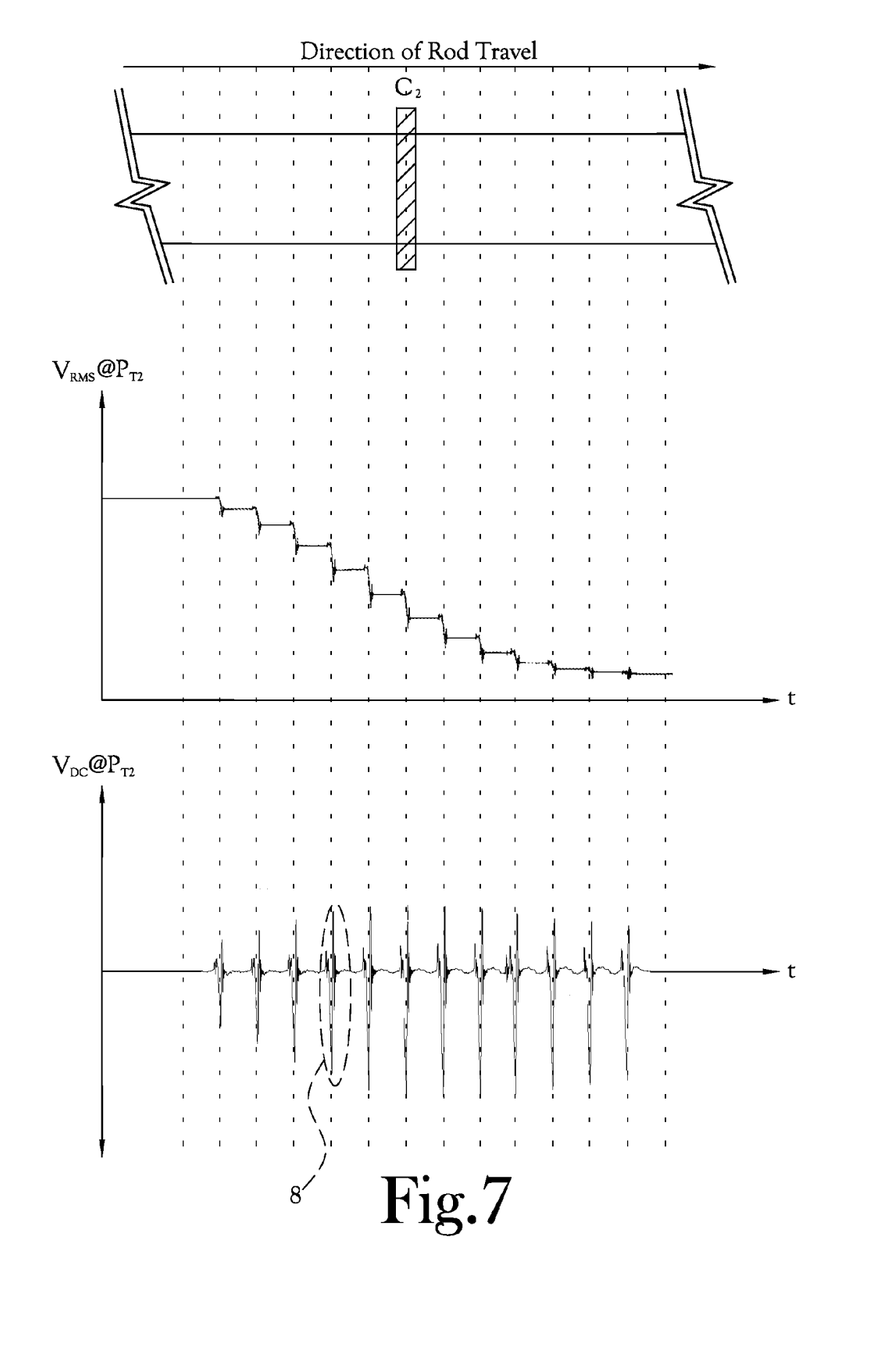
FIG. 7 shows the $V_{RMS}$ signal of FIG. 5 and the corresponding dc voltage signal obtained from the sampled data in relation to the movement the control rod.
Figure 8:
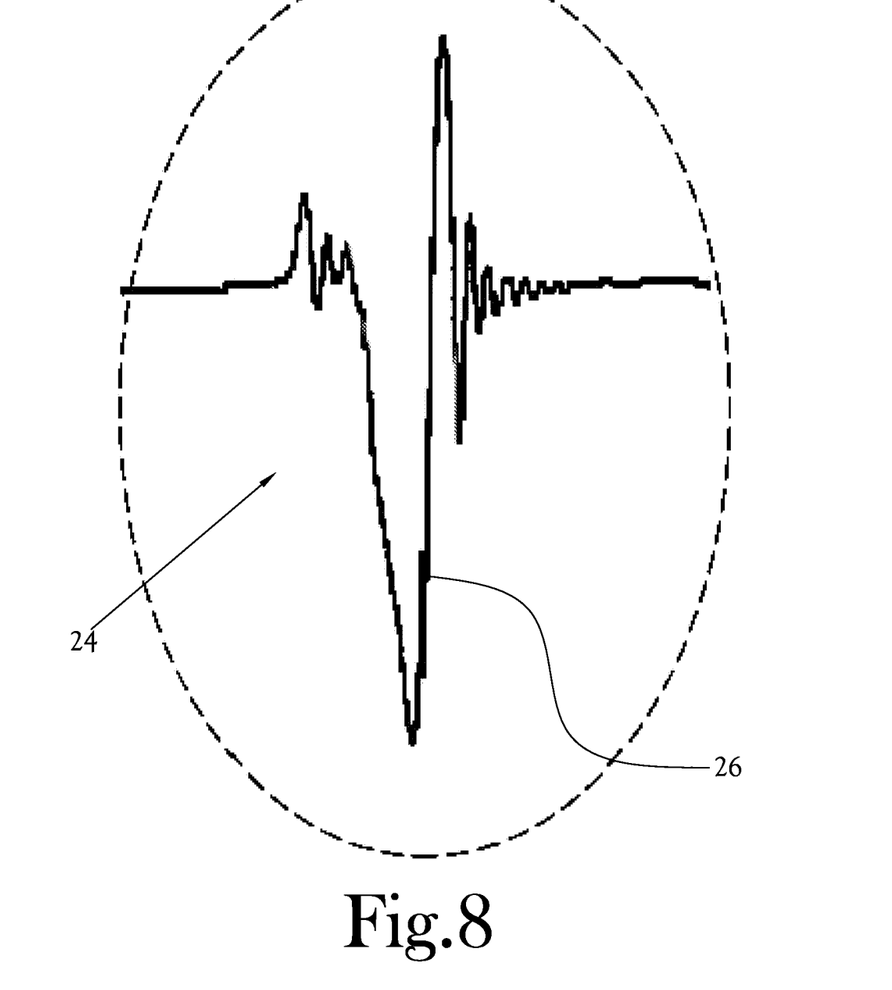
FIG. 8 illustrates features of the dc voltage signal from FIG. 7 corresponding to a single step in greater detail.

FIG. 5 substitutes a portion of the idealized signal shown in FIG. 4 with a root-mean-square (RMS) voltage obtained from the sampled data. FIG. 5 shows that every one of the 12 steps clearly produces a measureable change in the RMS voltage. More specifically, the RMS voltage obtained using the detector coil output shows a series of discrete steps that occur as a result of operation of the CRDM moving the drive rod one step at a time. In other words, the detector coil output produces a substantially constant RMS voltage 18a while the position of the control rod remains stationary. Each time the control rod moves, fluctuations 20 in the RMS voltage occur including an abrupt, discrete, and measurable change 22 in the amplitude of the RMS voltage. The amplitude change is followed by another period where the RMS voltage 18b remains substantially constant until the control rod moves again. These amplitude changes/fluctuations provide an identifiable characteristic introduced by and corresponding to movement of the control rod. FIG. 6 shows the RMS voltage change corresponding to a single step to illustrate the signal characteristics associated with movement of the control rod in greater detail. FIG. 7 relates the RMS voltage signal of FIG. 5 and a dc voltage signal obtained from the detector coil output to the movement of the drive rod through one coil. As with the RMS voltage signal, the dc voltage signal shows a voltage fluctuation corresponding to each step of the control rod. FIG. 8 shows the fluctuation 24 of the dc voltage signal for a single step of the control rod to more clearly illustrate the identifiable characteristics identifying movement of the control rod, namely a brief pulse or swing 26 from the dc voltage baseline having a minimum peak-to-peak voltage.

Unfortunately, this information is lost by conventional DRPI electronics during the differential analysis. However, the high resolution DRPI system disclosed herein bypasses the conventional DRPI system and captures the raw DRPI coil outputs thereby preserving this information. The high resolution DRPI system captures and processes this information allowing an accurate determination of the actual position of the drive rod with single step precision, effectively improving the resolution of the position information 6 times when compared to conventional DRPI systems. In one embodiment, the actual positions of the control rods are derived by accumulating the occurrences of the identifiable characteristics for each control rod starting from a known position. A count is added when a control rod moves upward, i.e., the detector coil output voltage increases, and a count is subtracted when a control rod moves downward, i.e., the coil output voltage decreases thereby allowing an accurate position determination with precision of a single step. In an alternate embodiment, the high resolution DRPI system is calibrated by moving the control rods through their entire range of motion and associating the output voltages of the coils with a rod position value. The calibration process may be repeated and the results averaged, if necessary, to create an accurate set of reference voltages. In operation, the processing unit compares the measured outputs of the detector coils with the set of reference voltages to accurately identify the positions of the control rods thereby allowing an accurate position determination with the precision of a single step.

While time-domain analysis of the RMS voltage and the dc voltage signals derived from the DRPI coil outputs has been disclosed, the information relating to the movement of the drive rod may be discerned through analysis of other derived signals and/or analysis in other domains, such as the frequency domain.

Figure 9:
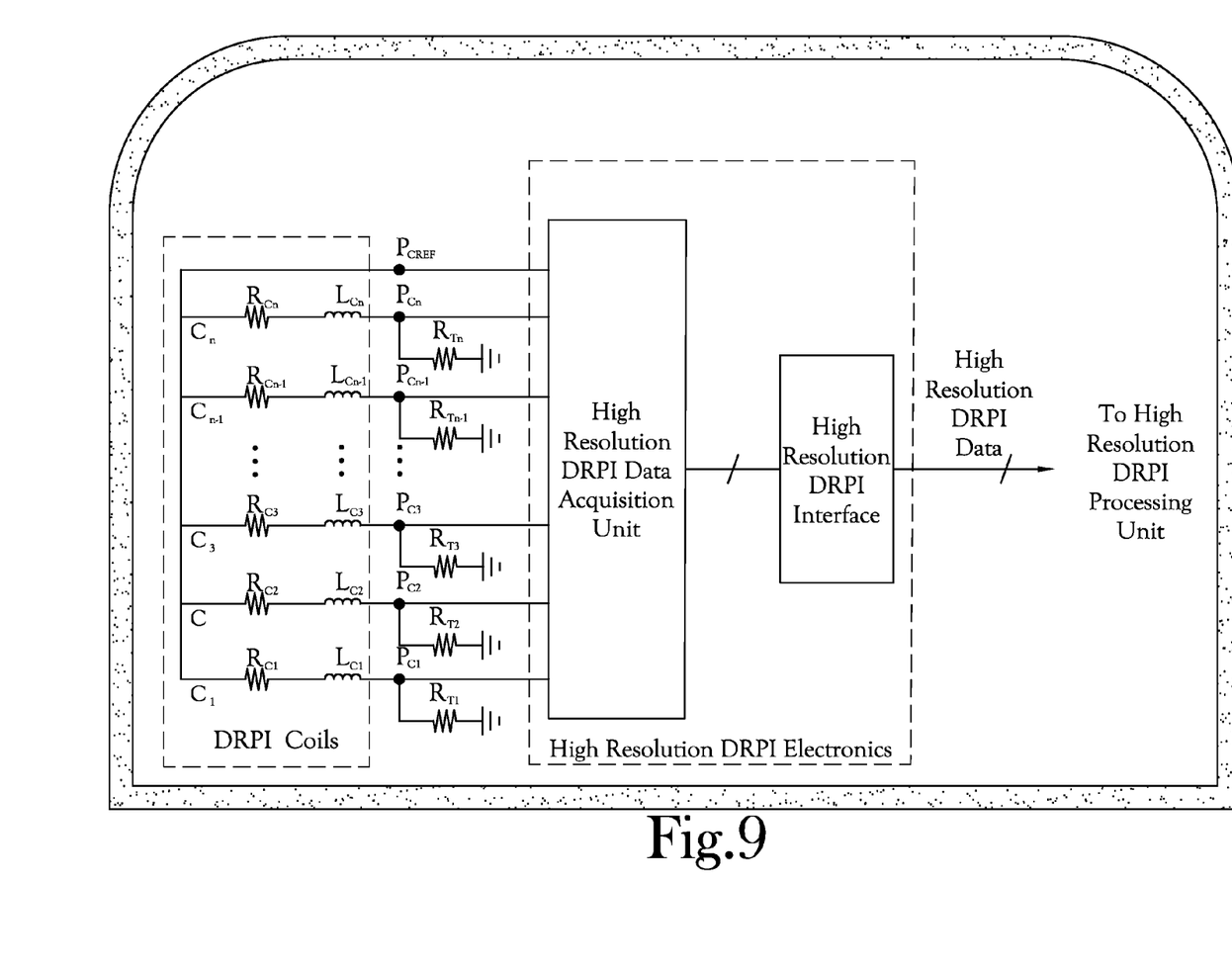
FIG. 9 is a block diagram of one embodiment of the high resolution DRPI system replacing a conventional DRPI system in a PWR.

FIG. 9 illustrates an alternate embodiment of the high resolution DRPI system that completely replaces conventional DRPI systems. In this embodiment, the high resolution DRPI electronics are connected directly to the DPRI coils and communicate directly with the high resolution DRPI processing unit located outside containment. The high resolution DRPI system may also replace a conventional ARPI system; however, as previously discussed, the detector of a conventional ARPI system differs from the DRPI coils used for drive rod presence sensing. Accordingly, when replacing a conventional ARPI system, the high resolution DRPI necessarily includes the DRPI detection coils.

Figure 10:
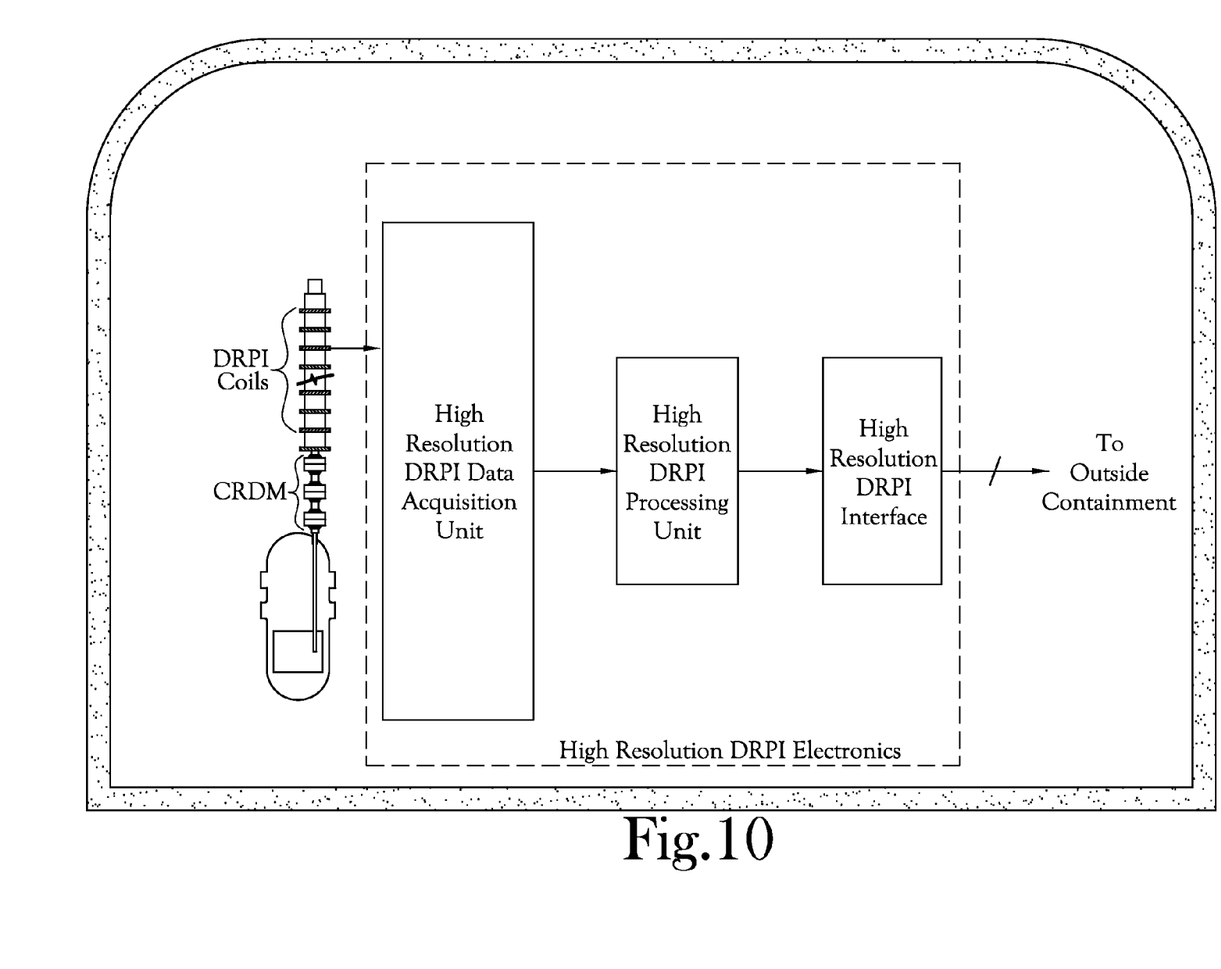
FIG. 10 is a block diagram of an embodiment of the high resolution DRPI system.

FIG. 10 illustrates an alternate embodiment of the high resolution DRPI system where some or all of the processing functions occur in the high resolution DRPI electronics. In the embodiment of FIG. 10, the high resolution DRPI electronics includes a processing unit receiving data from the high resolution DRPI data acquisition unit. In one embodiment, the processing unit in the high resolution DRPI electronics calculates the position information containment thereby reducing the amount of data that must be transferred to the main control system. In another embodiment, the processing unit in the high resolution DRPI electronics assumes all of the processing functions thereby eliminating the need for the high resolution DRPI system to provide a separate processing unit in the main control system. In this embodiment, the high resolution DRPI electronics communicate directly with other control systems in the PWR, such as the reactor control of the main control system or the logic cabinet in the rod drive system, or simply communicates with the user interface. For example, in a system using the CompactRIO previously described, the FPGA calculates axial position information. One skilled in the art will appreciate that the processing units described herein can be implemented using any number of logic components including controllers and processors without departing from the scope and spirit of the present invention.

From the foregoing description, it will be recognized by those skilled in the art that a high resolution DRPI system having improved resolution (i.e., single step precision) has been provided. The high resolution DRPI system provides accurate rod position information resolved to a single step thereby avoiding the numerous operation problems that occur when step counters fail and rod position is unknown.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

What is claimed is:

1. A high resolution digital rod position indication system for determining an axial position of a control rod within a reactor, the control rod being coupled to a drive rod that is moved by predetermined increments spaced apart along a range of motion, said high resolution digital rod position indication system comprising:

a plurality of detection coils spaced apart at predetermined intervals, the spacing of the predetermined intervals being greater than the spacing of the predetermined increments, adapted to be excited by a low voltage ac source, each of said plurality of detection coils adapted to sense the presence of the drive rod, each of said plurality of detection coils adapted to produce an output signal, said output signals having fluctuations corresponding to each incremental movement of the drive rod;

a data acquisition unit adapted to be placed in electrical communication with each detection coil of the plurality of the detection coils, said data acquisition unit sampling said output signals from the plurality of the detection coils;

a processing unit in communication with said data acquisition unit, said processing unit deriving the axial position of the control rod, relative to each predetermined increment, based on said fluctuations corresponding to the incremental movements.

2. The high resolution digital rod position indication system of claim 1 wherein said processing unit derives a root-mean-square voltage signal from said sampled data and said fluctuations being a measurable change in said root-mean-square voltage signal.

3. The high resolution digital rod position indication system of claim 2 wherein said processing unit begins with a known position and tracks occurrences of said fluctuations to update said axial position.

4. The high resolution digital rod position indication system of claim 2 wherein said axial position is determined from the amplitude of said root-mean-square voltage signal.

5. The high resolution digital rod position indication system of claim 4 wherein a set of reference values relating said amplitude of said root-mean-square voltage signal to a rod position is obtained by moving said control rod through a full range of motion, said processing unit comparing subsequently measured fluctuations to said set of reference values to determine said axial position.

6. The high resolution digital rod position indication system of claim 1 wherein said processing unit derives a dc voltage signal from said sampled data and said fluctuations being a fluctuation of the dc voltage.

7. The high resolution digital rod position indication system of claim 6 wherein said processing unit begins with a known position and tracks occurrences of said fluctuations to update said axial position.

8. A system for determining an axial position of a control rod within a reactor, the control rod being coupled to a drive rod that is moved by predetermined increments spaced apart within a housing, the housing being encircled by a plurality of detection coils spaced apart at predetermined intervals, the spacing of the predetermined intervals being greater than the spacing of the predetermined increments, capable of magnetically sensing the presence of the drive rod when the detection coils are energized by an ac current, said system comprising:

a data acquisition unit adapted to be placed in electrical communication with each coil of the plurality of detection coils, said data acquisition unit collecting sampled data from each coil of the plurality of the detection coils, said sampled data representing the electrical signals produced by each coil of the plurality of the detection coils; and a processing unit in communication with said data acquisition unit, said processing unit receiving said sampled data from said data acquisition unit, said processing unit evaluating said sampled data for fluctuations corresponding to each incremental movement of the control rod said processing unit deriving the axial position relative to each predetermined increment according to said fluctuations.

9. The system of claim 8 wherein said processing unit derives a root-mean-square voltage signal from said sampled data and said fluctuations being a measurable change in said root-mean-square voltage signal.

10. The system of claim 9 wherein said processing unit begins with a known position and tracks occurrences of said fluctuations to update said axial position.

11. The system of claim 9 wherein said axial position is determined from the amplitude of said root-mean-square voltage signal.

12. The system of claim 11 wherein a set of reference values relating said amplitude of said root-mean-square voltage signal to a rod position is obtained by moving said control rod through a full range of motion, said processing unit comparing subsequently measured fluctuations to said set of reference values to determine said axial position.

13. The system of claim 8 wherein said processing unit derives a dc voltage signal from said sampled data and said fluctuations being a fluctuation of the dc voltage.

14. The system of claim 13 wherein said processing unit begins with a known position and tracks occurrences of said fluctuations to update said axial position.

* * * * *